(12) United States Patent
Kruse

(10) Patent No.: US 11,259,072 B2
(45) Date of Patent: *Feb. 22, 2022

(54) ONLINE LIVE VIDEO SALES MANAGEMENT SYSTEM

(71) Applicant: CommentSold, Inc., Huntsville, AL (US)

(72) Inventor: Brandon Kruse, Huntsville, AL (US)

(73) Assignee: CommentSold, Inc., Huntsville, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/222,047

(22) Filed: Apr. 5, 2021

(65) Prior Publication Data

US 2021/0227285 A1    Jul. 22, 2021

Related U.S. Application Data

(63) Continuation of application No. 16/864,161, filed on May 1, 2020, now Pat. No. 10,992,982, which is a (Continued)

(51) Int. Cl.
*H04N 21/431*   (2011.01)
*G06Q 30/02*   (2012.01)
(Continued)

(52) U.S. Cl.
CPC ........ *H04N 21/4316* (2013.01); *G06Q 10/087* (2013.01); *G06Q 30/0267* (2013.01);
(Continued)

(58) Field of Classification Search
CPC .................................................. H04N 21/4316
See application file for complete search history.

(56) References Cited

U.S. PATENT DOCUMENTS 9,589,296 B1   3/2017  Li et al.
9,785,654 B2   10/2017 Kong et al.
(Continued)

OTHER PUBLICATIONS

Lauren Hallanan, "Amazon Live Is Alibaba's Live-Streaming Without The Good Bits", Forbes, https://www.forbes.com/sites/laurenhallanan/2019/03/15/amazon-live-is-alibabas-live-streaming-without-the-good-bits/#8dc53b294ab8, Mar. 15, 2019 (Year: 2019).
(Continued)

*Primary Examiner* — Michael H Hong
(74) *Attorney, Agent, or Firm* — ARC IP Law, PC; Joseph J. Mayo

(57) ABSTRACT

A sales administration system that manages online sales via overlays on a video stream. Customers can comment on or respond to the video stream, and may order products using simple phrases such as "Sold". The system can stream video with overlays to multiple clients simultaneously, including websites and mobile apps. Comments from all clients are received, aggregated, processed for orders, and displayed to the sales administrator. The system is coupled to a merchant's operational data, providing immediate visibility to changes in inventory and orders. Video overlays may be updated automatically by the system as this operational data changes, for example highlighting products with low stock. The system may analyze customer comments and orders both during the video stream and after the sales session is complete, and may generate recommendations to improve sales effectiveness. For backorders, customers may preauthorize charges to be at the front of the queue for shipment.

20 Claims, 11 Drawing Sheets

Related U.S. Application Data continuation of application No. 16/745,500, filed on Jan. 17, 2020, now Pat. No. 10,645,441, which is a continuation of application No. 16/573,989, filed on Sep. 17, 2019, now Pat. No. 10,575,045.

(51) Int. Cl.

| | |
|---|---|
| *G06Q 10/08* | (2012.01) |
| *G06Q 30/06* | (2012.01) |
| *H04N 21/24* | (2011.01) |
| *H04N 21/485* | (2011.01) |
| *H04N 21/81* | (2011.01) |

(52) U.S. Cl.
CPC ..... *G06Q 30/0277* (2013.01); *G06Q 30/0631* (2013.01); *H04N 21/2402* (2013.01); *H04N 21/4854* (2013.01); *H04N 21/4858* (2013.01); *H04N 21/812* (2013.01)

(56) References Cited

U.S. PATENT DOCUMENTS

| | | | |
|---|---|---|---|
| 10,440,436 B1* | 10/2019 | Taylor | H04N 21/234345 |
| 2008/0010171 A1* | 1/2008 | Ghanma | G06Q 30/0603 |
| | | | 705/28 |
| 2013/0173402 A1 | 7/2013 | Young et al. | |
| 2019/0095976 A1* | 3/2019 | Stubbs | G06Q 50/01 |

OTHER PUBLICATIONS

Drew Estelle, "Comment Selling 101: What is it and why do you need it?", CommentSold, https://insights.commentsold.com/comment-selling-101-what-is-it-and-why-do-you-need-it, Sep. 7, 2018 (Year: 2018).

International Search Report and Written Opinion received in PCT/US2020/051291, dated Oct. 14, 2020, 6 pages.

* cited by examiner

ONLINE LIVE VIDEO SALES MANAGEMENT SYSTEM

This application is a continuation of U.S. Utility patent application Ser. No. 16/864,161 filed 1 May 2020, which is a continuation of U.S. Utility patent application Ser. No. 16/745,500 filed 17 Jan. 2020, issued as U.S. Pat. No. 10,645,441 on 5 May 2020, which is a continuation of U.S. Utility patent application Ser. No. 16/573,989 filed 17 Sep. 2019, issued as U.S. Pat. No. 10,575,045, the specifications of which are hereby incorporated herein by reference

BACKGROUND OF THE INVENTION

Field of the Invention

One or more embodiments of the invention are related to the fields of video processing and electronic transaction processing. More particularly, but not by way of limitation, one or more embodiments of the invention enable an online live video sales management system.

Description of the Related Art

Selling products online through social media sites and apps is widely established. A relatively recent innovation that has been applied to these sales channels is "comment selling," where a user responds to a posted picture or description with a simple phrase that triggers an immediate sales order. For example, a user may view a posted image of a product and respond with "sold M", which indicates that the user wants to purchase size M of the product; this response may instantly generate a sales order.

While comment selling has simplified the online sales process, it has not yet been applied effectively to online video sales. Live video streams are increasingly used by merchants to highlight their products or to educate their customers. However, tools to manage the online video selling process and to provide a simple purchase experience like comment selling for video streams are not known in the art.

For at least the limitations described above there is a need for an online live video sales management system.

BRIEF SUMMARY OF THE INVENTION

One or more embodiments described in the specification are related to an online live video sales management system. Embodiments of the system provide tools that modify a video stream, for example to highlight products for sale, distribute the modified video stream to potentially heterogeneous clients for viewing, and aggregate and process customer responses from those clients.

One or more embodiments of the system receive, process, and manage a video stream that is used during an online sale. The system may include a database, which may contain data such as products, inventory, backlog, orders, and customers. The database may be coupled to one or more processors that execute system components. These components may include a sales administration system, a video distribution system, and a response processing system.

The sales administration system may display products from the database, and the quantity in stock from the inventory table or tables in the database. It may accept a selected product from a user, and may then generate an overlay on the frames of the video stream. The overlay may contain information associated with the selected product, and a response template that indicates a purchase of the selected product. The sales administration system may also display responses from customers who view the video stream.

The video distribution system may stream the modified video stream that contains overlays to one or more clients that execute interactive video player applications. Each interactive video player application may be viewed by multiple customers. Each displays the modified video stream, and accepts customer responses. Responses may be tagged with the identifier of the customer who responds.

The response processing system may obtain customer responses from all of the interactive video player applications that receive the video stream. When a response matches the response template, it may generate a purchase transaction and update the database accordingly. Responses may also be sent to the sales administration system for display.

In one or more embodiments, the video overlay may contain product information such as a product identifier, a price, a product image, or a list of product options. The response template may include a keyword or key phrase (such as "sold"), the product identifier, an optional quantity, and optional product options.

Interactive video player applications may be for example websites or mobile apps. Each may have a video display area that displays the video stream with the product overlays, and a customer comment area that accepts customer responses. The video distribution system may generate a video stream for two or more different types of interactive video players, where each video stream is based on a video interface of the respective video player. The response processing system may transform responses from different interactive video player applications into a common response format. An illustrative system may for example transmit video to two or more different websites and to a mobile app that is used by multiple customers.

In one or more embodiments the video distribution system may monitor the quality of the modified video stream, and may switch to an alternative stream if the quality falls below a threshold value.

In one or more embodiments the responses displayed by the sales administration system may include customer importance information obtained from the database. For example, customer importance may be based on the number or revenue of previous orders by the customer.

In one or more embodiments, the video stream overlay may be updated automatically by the sales administration system. For example, it may be updated when inventory of the selected product changes. The overlay may be updated to indicate that one or more product options are no longer available, that a limited number remain in stock, or that a certain number of additional orders are required before the product will be restocked.

One or more embodiments may position an overlay in a video frame so that it is proximal to the image of the selected product in the frame. The database may contain product images, and the sales administration system may analyze each frame to locate the image of the selected product in the frame. In one or more embodiments, multiple products may be selected, and multiple overlays may be added to the video frames, each proximal to the corresponding product image in each frame. In one or more embodiments, the sales administration system may perform product selection automatically by recognizing images of products that are visible in the frames.

In one or more embodiments the sales administration system may generate and display sales recommendations based on analysis of customer responses. Recommendations may include for example selection of a different product, modification of the overlay, or modification of the video stream content. The system may recommend that a specific customer be mentioned in the video stream. A customer to mention may be for example one who is either new, or who has previously purchased a significant number or value of products.

One or more embodiments may include a sales effectiveness analysis system that analyzes the video stream and the responses after the video stream and the online sale are completed. It may identify for example audio or visual elements in the video stream that were effective in generating sales or responses, or product selections that resulted in high levels of responses or sales. It may also recommend one or more video frames to use as static images for marketing, and one or more product display methods (such as use of particular models) to use to market products.

For orders that are backlogged, one or more embodiments may prioritize these orders based for example on customer data, order size, or other factors. For example, a customer who preauthorizes a charge for a backlog order may receive priority in shipment. Other customer data, such as customer order history, may also affect the priority of customers in the backlog. For example, a customer with a large number or large value of previous orders may be prioritized higher. Other factors that may contribute to the customer's priority in the backlog may include the customer's order return history, credit score, and fraction of previous backlogged orders that were ultimately purchased by the customer.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION OF THE INVENTION

An online live video sales management system will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
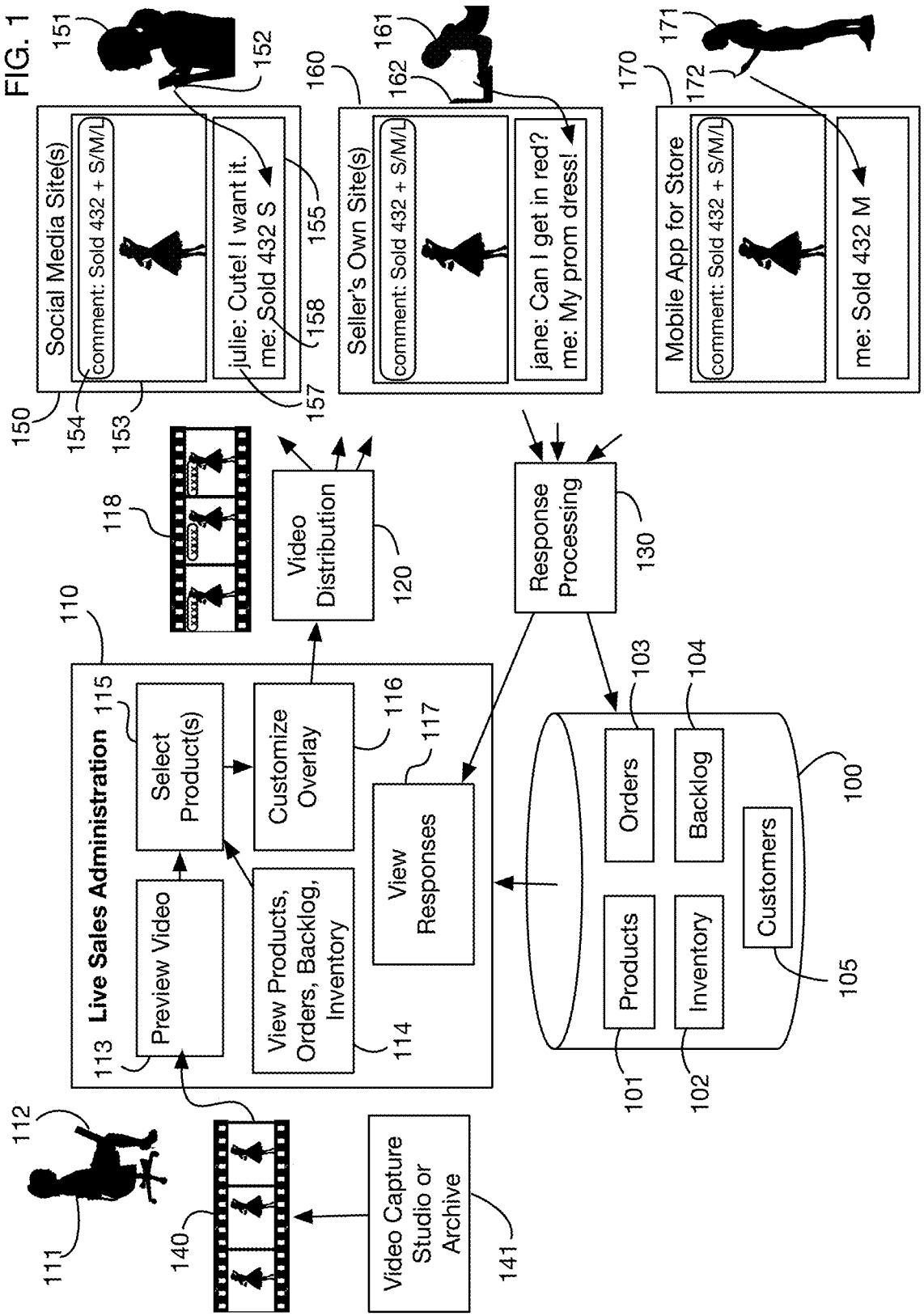
FIG. 1 shows an architectural diagram of illustrative components of an online live video sales management system.

FIG. 1 shows an architectural block diagram of an embodiment of the invention. This embodiment includes a database 100, a sales administration system 110, a video distribution system 120, and a response processing system 130. The system may be used for example by a merchant or other entity who sells or offers products or services using a live video stream 140. Components of the system manage aspects of the sales process, such as overlaying product information on the video stream, publishing the video to client applications, and receiving and processing responses from customers with comments or orders. The components of the system may execute on one or more processors as software applications or modules. Embodiments may distribute system functionality across processors in any desired manner. Illustrative computer hardware that may be used in one or more embodiments to execute any or all of the components of the system is described below with respect to FIG. 11.

Database 100 may contain operational data of the merchant, such as tables or other data structures related to products 101, inventory 102, orders 103, backlog 104, and customers 105. These tables are illustrative; any data that supports the sales process or business operations may be included in database 100. Products data 101 may for example include data such as product names, numbers, descriptions, images, prices, and options (such as sizes or colors). Inventory data 102 may for example include a quantity in stock for each product. Orders data 103 may include purchase orders from customers, including both historical orders that have been fulfilled and outstanding orders that have not been shipped; order details may include products, quantities, and options. Backlog data 104 may track orders that cannot be fulfilled until stock is replenished. Customers data 105 may include for example customer contact information, customer identifiers on various sites or applications, how long a customer has been active or registered, and financial profile information such as the customer's payment history and credit history. In one or more embodiments, database 100 may be a set of databases, files, or other data sources. Database 100 may include data from remote data sources or data services.

Sales administration system 110 may be used by merchant personnel to manage the live video sale process. For example, user 111 may use a computer 112 executing the administration system 110 to monitor and modify aspects of the sale, such as the video feed, the product or products on offer at different points in time, and the responses from customers. In one or more embodiments, sales administration system 110 may be used by multiple users simultaneously. The sales administration system 110 is connected to video stream 140, which may be generated live by a video capture studio 141, or it may be streamed from a prerecorded video archive. The video capture may be performed by the merchant administering the sale, or by another studio separate from the merchant. In one or more embodiments, the staff managing or participating in the video capture process 141 may also use one or more features of the sales administration system 110; for example, the producer of the video may be able to see incoming comments from the customers, and may modify the video recording accordingly, such as by responding to customer questions or comments in the video.

The video stream 140 may for example showcase one or more products offered by the merchant. The sales administration system 110 may be used to integrate data about these products into the video stream, which may enable customers watching the modified video stream to order products directly during (or after) the live video stream. The sales administration system 110 is connected to database 100, so that up to date operational data is available to user 111 to make decisions about the sales process. This data may also be used to automatically modify the video stream in one or more embodiments. Sales administration system 110 may provide a preview video feature 113, with which user 111 may view the video stream 140, and may view the modified video stream that includes product data or other added information. A display or query feature 114 may be provided so that the user can view the products, orders, inventory, and backlog data (or any other information) in database 100. The user may then select a product or products 115 to highlight in the video stream. Typically, but not necessarily, this may be a product that is currently visible in the video stream. For example, a clothing merchant may produce a live video with models showing various articles that the merchant offers. As different articles are displayed in the video, the sales administrator 111 may select some of these products using feature 115, and may generate and customize a video overlay using feature 116 to display information about the selected product or products. Products may be selected using any type of user interface; for example, user 111 may type in the name or identifier of the product, select the product from a list, scan a barcode associated with the product, or take a picture of a product that is matched against product images in database 100. The overlay may include a response template that informs customers viewing the video how they should respond to indicate that they want to make a purchase. As described below, the system allows customers to purchase items with simple comments or responses made directly to the live video. The simplicity and immediacy of these purchase transactions (performed by replying to or commenting on the video) may significantly improve sales effectiveness and revenue.

Because the sales administration system 110 displays inventory and backlog data, user 111 may use this data in selection of products to highlight. For example, if a product is out of stock, the user may select a different product. If there are only a few items of a product left in inventory, the overlay may be modified to indicate this scarcity. Any data from database 100 may be used either by user 111 or automatically by the sales administration system 110 to modify the overlay for the video stream. Database 100 may be updated live as transactions occur, and these updates may be displayed immediately in the sales administration system 110; this online processing ensures that data in the video stream shown to customers is current, leading to improved customer satisfaction and sales.

In one or more embodiments, the video stream 140 may be modified in other ways instead of or in addition to adding one or more overlays onto the frames of the stream. For example, image processing may be used to visually highlight the selected product or products, for example by dimming areas of the frame other than the product or by brightening the pixels of the product image. Other graphics may be added to the video stream, such as arrows pointing to the selected product or products. Any of these modifications may be done manually by a sales administrator 111 or automatically by the system.

The modified video stream 118 may be streamed to a video distribution system 120, which transmits the modified stream over one or more networks to one or more interactive video player applications. These applications may be used by or viewed by customers, who may then generate responses to the video including purchases of displayed products. An interactive video player application may be any website, application, mobile app, client, server, or system that displays the modified video stream 118 to one or more viewers. In some embodiments the video player application may provide a commenting feature for users to respond to the video. In other embodiments users may respond to a video using other tools or features, such as texting or email. An interactive video player application may be for example a web page with a frame that displays the video stream. For example, live video streams may be accessed by users on Facebook® pages, on YouTube®, or on similar social media sites. An interactive video player application may be a mobile app, such as an app associated with the merchant or with a group of merchants, that shows the video on a mobile device (such as a phone or tablet) and that allows the user to respond. The modified stream 118 may be sent via video distribution system 120 to interactive video player applications over any type of network using any desired protocol; for example, the stream 118 may be transmitted over an Internet connection to a web server that then streams the video to clients viewing a web page hosted by that web server.

FIG. 1 shows three illustrative interactive video player applications 150, 160, and 170. Application 150 is a web page of a social media site; application 160 is a web page on the merchant's web site; and application 170 is a mobile app provided by the merchant. Customer 151 views site 150 using device 152; customer 161 views site 160 using device 162; and customer 171 views mobile app 170 using device 172. The devices used by customers may be any type of computing or display devices, including for example, without limitation, a mobile phone, a personal digital assistant, a tablet, a laptop, a notebook, a desktop computer, a smart watch, smart goggles, or a virtual reality headset. Video distribution system 120 may format or adapt the modified video stream 118 to conform to interface requirements of the various interactive video players to which the stream 118 is sent. For example, different websites or applications may support different protocols, different video encoding formats, different resolutions, or differences in how video streams are setup, maintained, and terminated. Video distribution system 120 manages simultaneous streaming to these potentially heterogeneous video players.

The overlay added in step 116 to the video stream is shown as part of the video in the video window of each video player application. The overlay may be integrated into each video frame, or in one or more embodiments the overlay may be transmitted as metadata that is then added to the video frames by the media player. A simple overlay 154 is shown in video window 153 of video player application 150; this overlay contains the response template that a customer may use to respond to indicate a purchase of the product. In this illustrative response template, the keyword "Sold" must be entered with the product identifier "432" to indicate a purchase of this product. The product options, in this case a size, are also listed, and the selected size should be entered as part of the response for a purchase. One or more embodiments may use any key word or key phrase to indicate a purchase. The response template may include another data such as product identifiers, product options, or purchase quantities.

Each video player application shown is interactive, in that the user can interact with the video by posting replies or comments. For example, in video player application 150, a comment area 155 appears below the video window 153. Customer 151 can comment in this area, and can view comments from other viewers of the video. For example, comment 157 is from another user, and comment 158 is entered by the customer 151. Comment 158 matches the response template 154, so it triggers a purchase order from this customer for the selected product.

One or more embodiments may provide customer interaction using mechanisms other than or in addition to a comment area. For example, customers may be able to respond to a video using a text message, email, voicemail, or any other type of communication. The response template may for example indicate that a customer can send a text to a particular number to purchase a product, or send an email to a particular email address.

Response processing system 130 obtains, standardizes, aggregates, and processes the customer responses from all of the video player applications. Responses from different video player applications or other tools may be transformed to a common format for analysis and further processing. Each response may be tagged with data such as the identifier of the person responding, the site or app from which the response was generated, and a timestamp of when the response was generated. Responses may be processed to generate sales transactions, which result in updates to orders, inventory, and backlog data in database 100. They may also be aggregated, filtered, tagged, sorted, categorized, or otherwise processed, and forwarded to a response viewing feature 117 in the sales administration system 110. User 111 may then view the responses from users, potentially in almost real time, to gauge the reaction to the video stream and to adjust the sales process accordingly. The response viewing feature 117 may also be available to the video production staff performing capture 141 so that video content may be adjusted as desired based on incoming responses.

Figure 2:
FIG. 2 shows a screenshot of an illustrative user interface of the sales administration system.

FIG. 2 shows an illustrative screenshot 200 of an embodiment of sales administration system 110. Video stream preview window 213 shows the video stream with the overlay 254. The overlay includes the response template, the product options, a thumbnail image 264 of the product, and the product price 265. This data is illustrative; one or more embodiments may include any information related to the product or the response template in an overlay. In this example the product options are sizes (S, M, or L); in one or more embodiments product options may include for example, without limitation, any or all of sizes, colors, styles, quantities, materials, patterns, or configurations. Product selection window 215 shows products available; the sales administration user may select a product for example by clicking on the desired product, by searching in a search field, or by scanning a barcode. Product detail window 202 shows details for the currently selected product, including the product options and the current inventory for each option. Customer response window 217 shows aggregated comments made by customers on the live video. Comments are tagged with the origin site or application 261. Some comments such as comment 258 match the response template for an order, and are flagged as orders; for others the label shows that they are not orders. Comments that represent orders may be in various stages of a purchase; for example, a customer may have indicated an intent to purchase but may not yet have completed checkout. The labels or tags associated with comments may also indicate these purchase stages; for example, labels may indicate stages such as "not order," "in cart", "checkout in process," "payment submitted," and "payment authorized".

Figure 3:
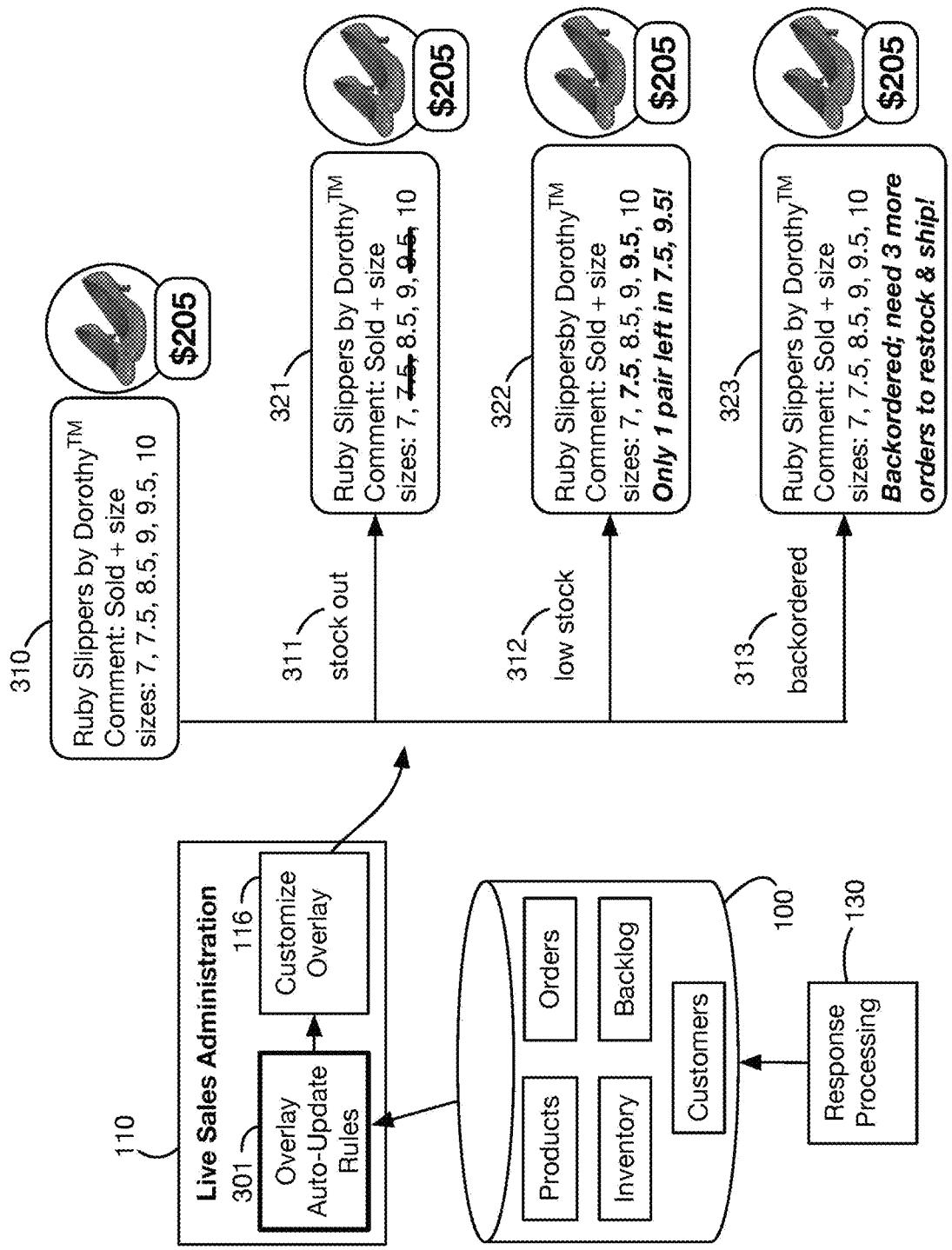
FIG. 3 shows illustrative automatic updates to video overlays that are triggered by changes to operational data.

The overlay added to a video stream may be modified by a user, or automatically by the live sales administration system as the merchant's operational data changes. FIG. 3 shows illustrative automatic modifications of overlays as a result of changes in inventory and backlogs. In this embodiment, live sales administration system 110 includes rules 301 that define what updates should be made automatically to video overlays. These rules may be defined or modified by users of the administration system. Database 100 may be updated based on response processing system 130 (which may generate orders based on comments), or based on other business transactions. Database updates may be processed by the overlay auto-update rules 301, generating automatic changes to the overlay. For example, the rules 301 may be implemented as database triggers. FIG. 3 shows three illustrative automated updates of an overlay 310. If a stock out 311 occurs for certain product options, modified overlay 321 may shows that these options are no longer available, for example by crossing out those options. If a low stock threshold 312 is reached for certain product options, these options may be highlighted in modified overlay 322, and a message may be added encouraging customers to act quickly if they want those options. If a backorder condition 313 occurs for a product, modified overlay 323 may add a message describing the backorder and indicating how many additional orders are needed to trigger restocking of the product by the merchant. These modifications are illustrative; one or more embodiments may define any rules to generate any types of modifications to the video overlays.

Figure 4:
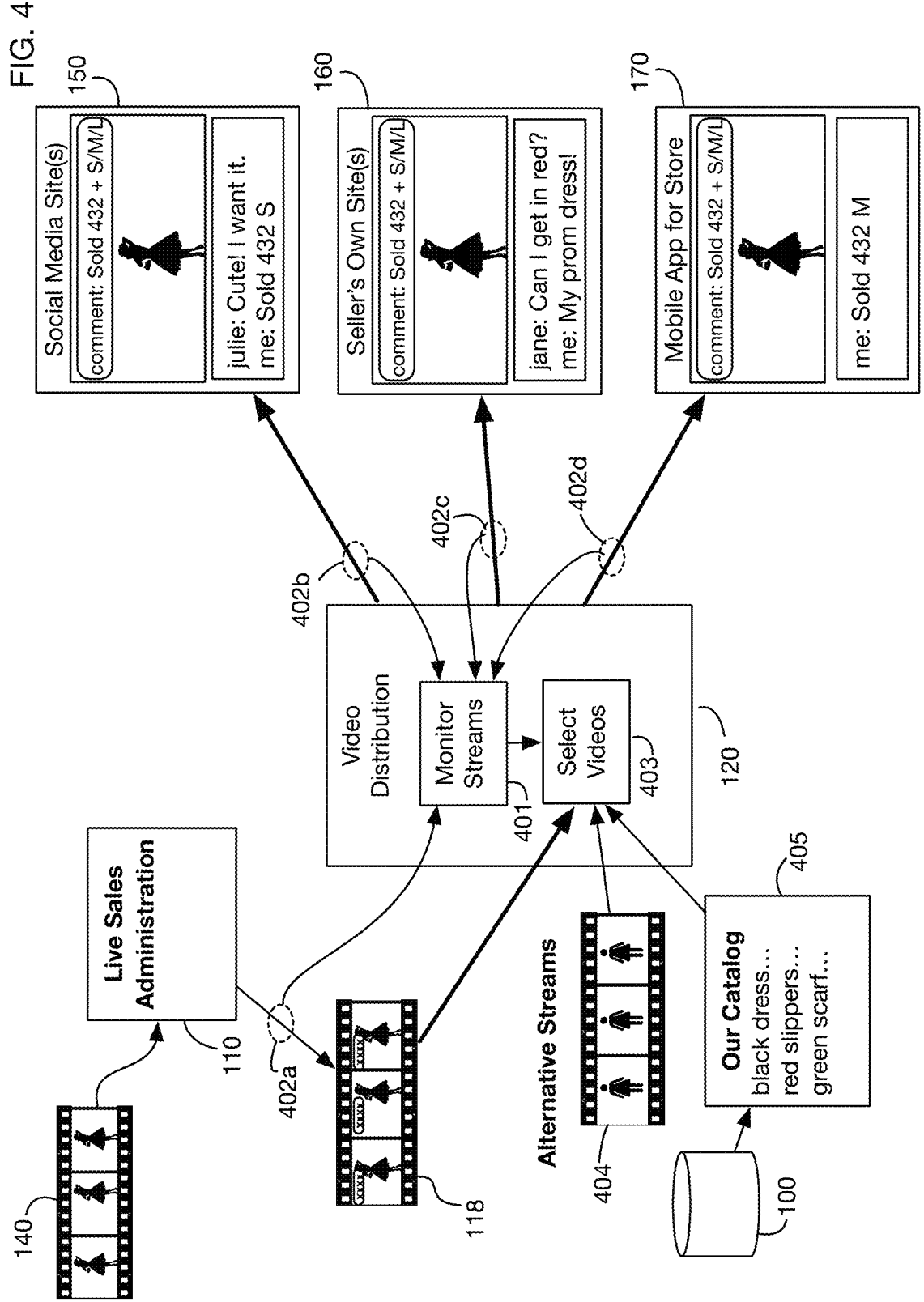
FIG. 4 shows an embodiment that switches to an alternative video stream if the video quality of an incoming or outgoing stream falls below a threshold.

One or more embodiments may monitor the incoming and outgoing video streams, and may switch to an alternative video stream if stream quality or other parameters fall below certain thresholds. FIG. 4 shows an illustrative embodiment of video distribution system 120 that includes a stream monitoring module 401 and a video stream selection module 403. The stream monitoring module 401 may for example monitor the transmission rate, error rate, or other stream quality parameters of the modified video stream 118 generated by the sales administration system 110, and of the streams that are forwarded to the video player clients such as clients 150, 160, and 170. Network monitoring modules 402*a*, 402*b*, 402*c*, and 402*d* may for example monitor these streams and feed information on stream quality to monitoring module 401. If monitoring module 401 detects problems in an incoming or outgoing stream, it may switch one or more of these streams to an alternative stream 404. An alternative stream may for example be more reliable, or may consume less bandwidth. Automatic switching to a backup stream may be valuable for example for a video player client that may disconnect if the incoming stream becomes unreliable. In one or more embodiments, an alternative stream may consist of one or more still images 405 that are automatically generated from database 100; for example, these images may be static listings of product catalogs, product images, or similar items.

Figure 5:
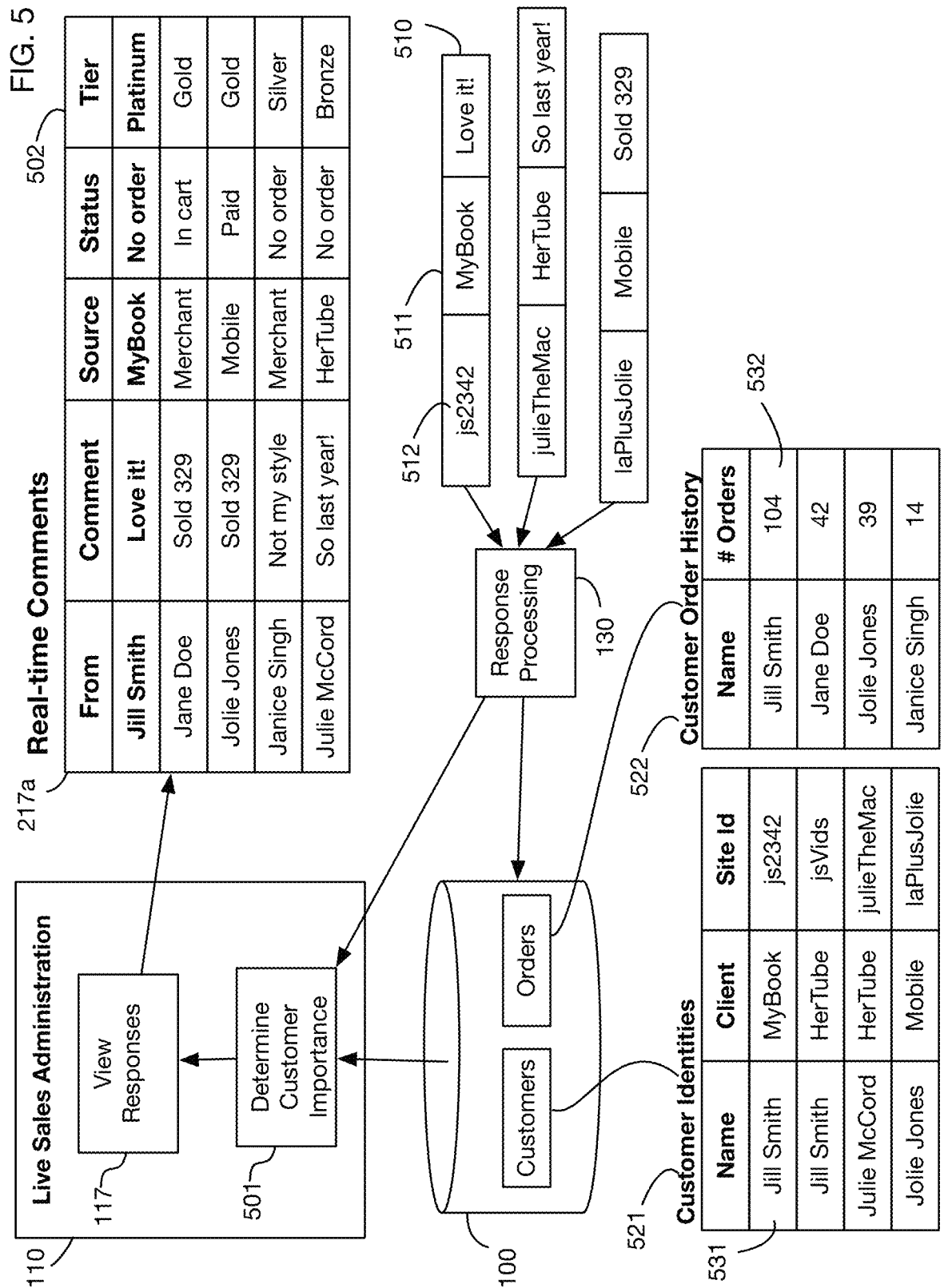
FIG. 5 shows an illustrative embodiment that sorts and tags incoming customer comments based on customer importance.

The live sales administration system may display incoming customer responses, and may augment or process the responses to assist sales and product personnel in adapting the video or overlay or in responding to incoming comments. For example, one or more embodiments may access customer data in the database to determine the relative importance of a customer who has responded, and may highlight responses from more important customers. Customer importance may be determined in any desired manner. FIG. 5 shows an illustrative embodiment with a customer importance module 501 that in this example groups customers into importance tiers. The responses 217*a* displayed by viewing module 117 of sales administration system 110 include the customer importance tier 502, and sort customer responses by customer importance. Responses from top-tier importance customers are highlighted. This tagging, sorting, and highlighting draws attention to the important customers, so that sales administrator may for example generate a personal response to the important customers, or may suggest to video production staff that they mention these important customers in the video.

In the example shown in FIG. 5, customer importance is determined based on the number of orders each customer has placed in the past. The response processor 130 obtains responses that are tagged with a source (such as a website) and a customer identifier; for example, response 510 is from source 511 and customer 512 on that source. This identifier 512 must be correlated with customer data in database 100. This correlation may be defined for example in customer identities table 521, which maps these source-specific identifiers to a common customer identifier such as customer name 531. A customer order history table 522 may then map this customer name into an order history, which may provide for example the number of orders each customer has placed or the total revenue of those orders. This data may be used to determine the customer importance, with customers who have placed more orders or orders with more sales revenue ranking higher in importance. One or more embodiments may use any other data to determine customer importance, such as for example a customer's projected net worth, credit score, payment reliability, or zip code. In one or more embodiments, a new customer may be ranked as more important than existing customers, since it may be considered more important to provide a good first impression to a new potential purchaser.

Figure 6:
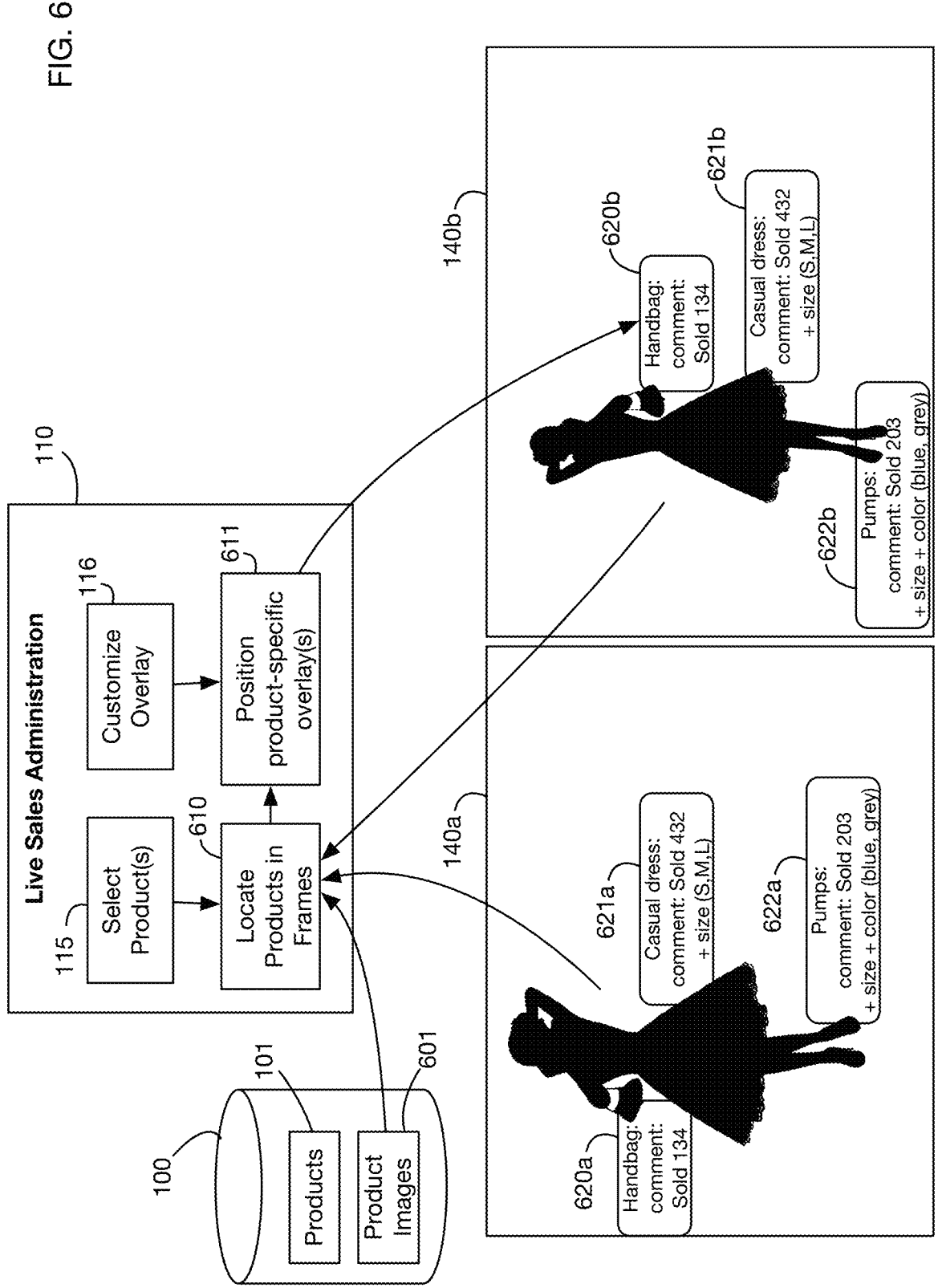
FIG. 6 shows an embodiment that analyzes video frames to locate product images, and positions video overlays on or near the associated product images in the video frames.

In the illustrative overlays shown in FIGS. 1 and 2, an overlay for a single product is added at the top of each video frame, in a fixed position. One or more embodiments may instead dynamically position overlays, and may in some cases generate overlays for more than one product at a time. These features are illustrated in FIG. 6. Two illustrative frames 140*a* and 140*b* from the video stream are provided to the sales administration system 110. As previously described, a sales administration user uses the select product(s) module 115 to select one or more products, for example from a list or by scanning barcodes. In the scenario illustrated in FIG. 6, the user selects three different products. Associated with the products data 101 in database 100 is product image data 601; this product image data may provide illustrative images, colors, sizes, shapes, or other data that supports identification of product images within frames 140*a* and 140*b*. Product image data is input into product location module 610, which analyzes the frames and finds the location within each frame of each of the selected products. This analysis and product location process may use for example technologies known in the art for identifying and locating items within images, such as neural networks that are trained on sample item images. The product locations within the frames are provided to overlay positioning module 611, which positions an overlay for each product proximal to or over the image of each product within each frame. As products move from frame to frame, the overlay positioning module 611 repositions the product-specific overlays so that they track the visible product positions in each frame. For example, the handbag product overlay moves from position 620*a* in frame 140*a* to position 620*b* in frame 140*b*; the dress overlay moves from position 621*a* to position 621*b*, and the pumps overlay moves from position 622*a* to position 622*b*. The overlay positioning module 611 may also perform layout processing to ensure that overlays do not intersect or obstruct one another.

In one or more embodiments, the product location module 610 may support fully or partially automated product selection, as a replacement for or adjunct to the manual product selection process 115. For example, product location module 610 may scan a frame and may identify any visible products it finds in the frame; overlays may then be constructed automatically for these products. This capability may provide for a fully automated video selling process, wherein a video feed is automatically annotated with overlay banners for any visible products that appear in frames of the video. If a sales administrative user is available, the user may review the automated product selections and modify them as desired, or customize overlay banners as desired. One or more embodiments may support variations of these ideas. For example, a user may select a group of products prior to starting a video feed, and the system may then determine which product or products within this group appear in each frame without further user input as the video proceeds.

Figure 7:
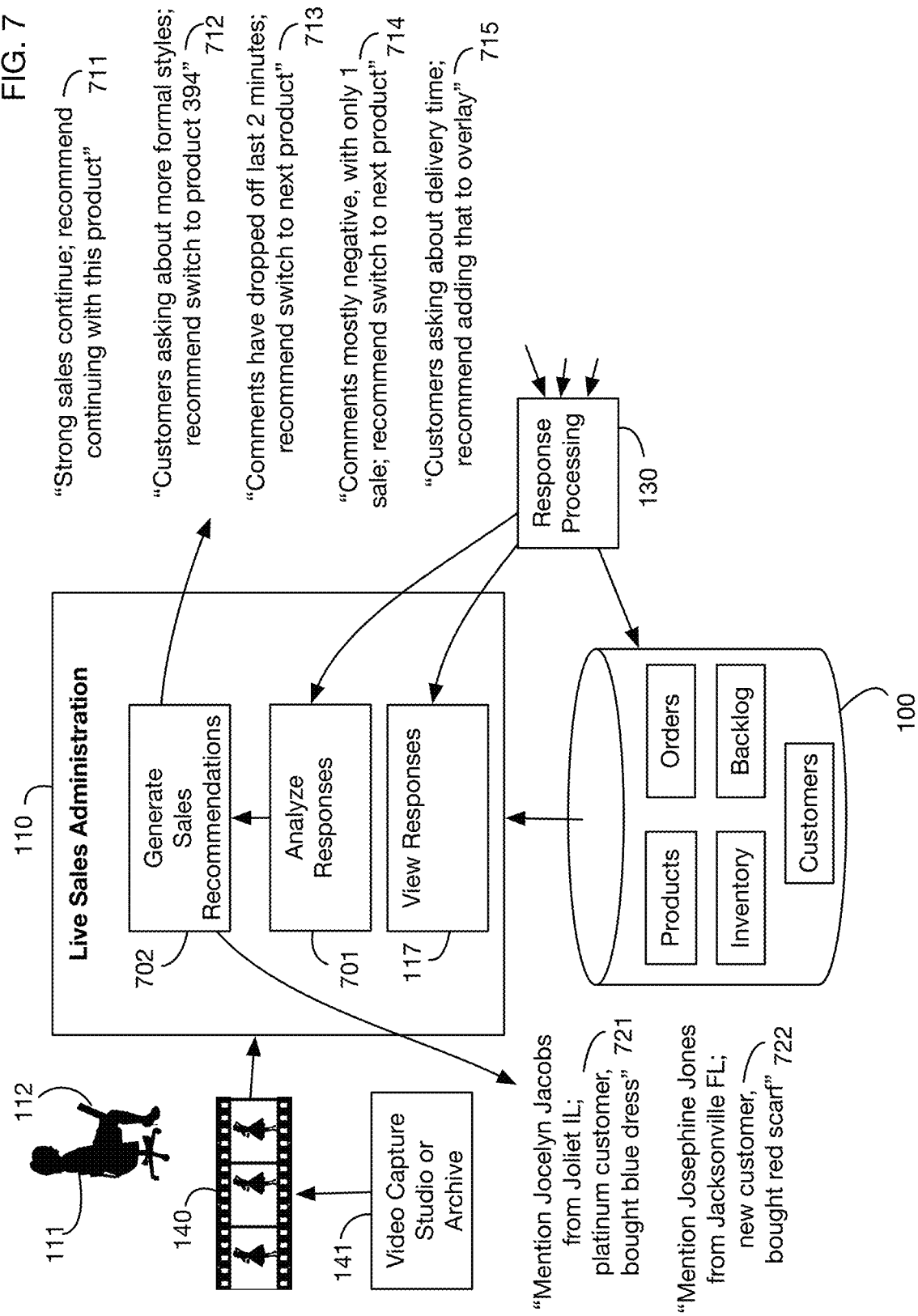
FIG. 7 shows an embodiment that analyzes customer responses to generate sales recommendations during a live sale.

In one or more embodiments, the sales administration system 110 may analyze incoming responses from customers and may generate sales recommendations based on this analysis. Recommendations may be displayed for example to the sales administrator or to video production staff. FIG. 7 shows an illustrative example where incoming responses are aggregated by response processing system 130, and are transmitted to a response analysis module 701 in the sales administration system. Analysis results are input into a sales recommendations module 702, which generates and displays recommendations. These recommendations may include for example recommended products to select next, recommended changes to overlays, recommended price changes, or recommended mentions of customers in the video feed itself. FIG. 7 shows several illustrative recommendations. Recommendation 711 suggests continuing with the currently selected product because sales are continuing at a strong pace (or because comments are largely positive and continuing). Recommendation 712 suggests switching to a specific product based on an analysis of the comments from customers. Recommendation 713 suggests switching to another product because the trend of comments has declined. Recommendation 714 suggests switching to another product because comments are mostly negative, and sales are weak. Recommendation 715 suggests modifying the overlay to answer a question that occurs frequently in comments. One or more embodiments may correlate responses with customer data in database 100, and may suggest for example that the video mention specific customers, possibly because they are particularly valuable customers (who have made a high number of purchases or purchases of high aggregate value compared to a threshold), or because they are new customers. The recommendation module 702 may also retrieve data from database 100 to suggest personalized mentions, such as mentions of the person and where they are from. Illustrative recommendation 721 suggests mentioning a high value customer, and illustrative recommendation 722 suggestions mentioning a new customer. The recommendations shown in FIG. 7 are illustrative; one or more embodiments may generate any types of sales recommendations for any aspect of the selling process, based on analyses of incoming comments, database information, or any other relevant data.

Figure 8:
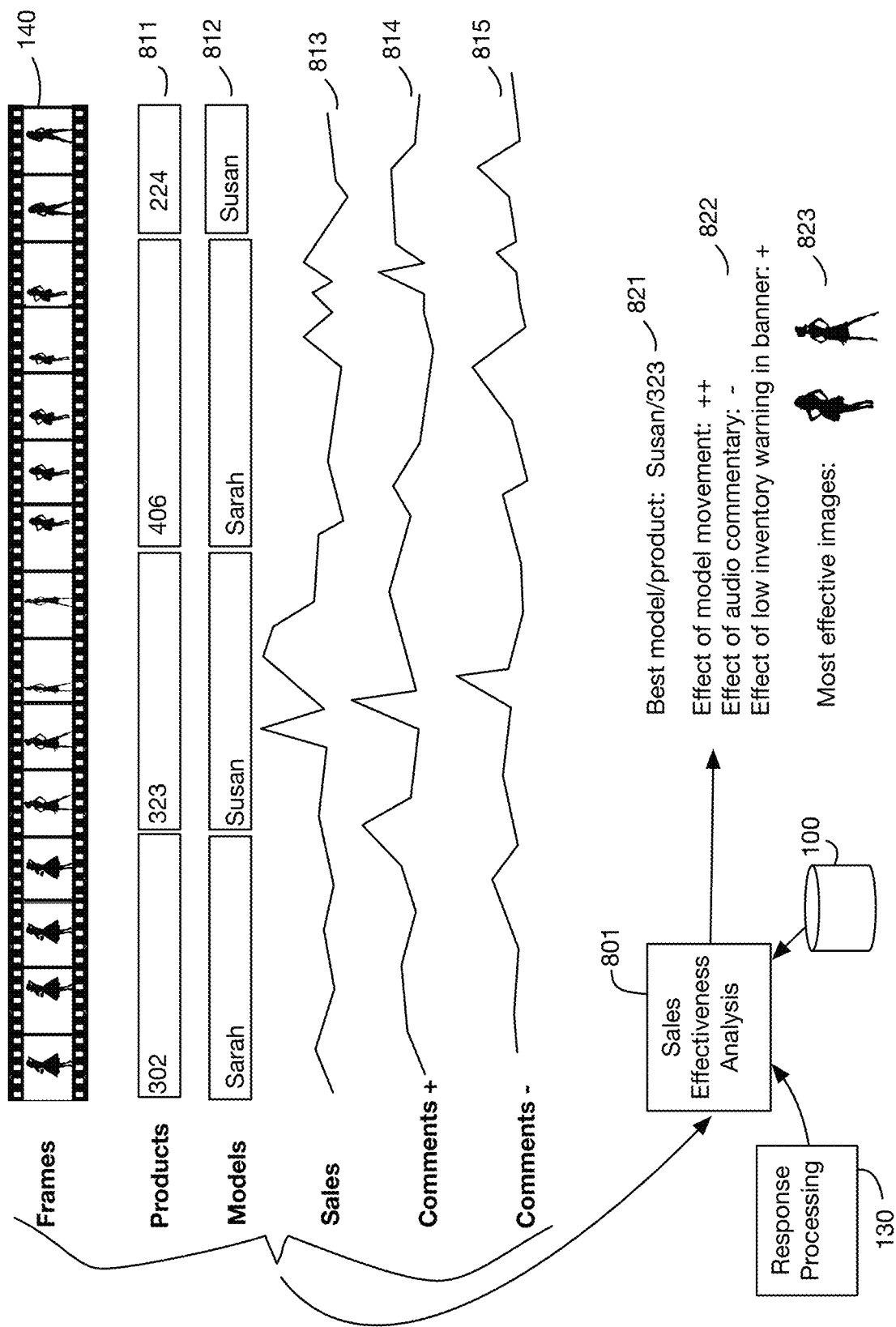
FIG. 8 shows an embodiment with a sales effectiveness analysis system that analyzes a sales session after it is over.

In addition to or instead of generating sales recommendations during a live sale, one or more embodiments may analyze a sales session after it has completed, and may generate conclusions or recommendations based on this analysis. FIG. 8 shows an illustrative embodiment that incorporates a sales effectiveness analysis system 801. This system processes data captured from a sales session, which may include for example the video frames 140, the timeline of which product or products were selected and shown in overlays 811, the timeline of models that modeled products 812 (for example for clothing sales), the timeline of sales volume 813, and the timeline of the numbers of positive comments 814 and of negative comments 815. The counts of positive and negative comments over time may be derived for example by performing sentiment analysis on the text of responses obtained from response processing system 130. Sales effectiveness analysis system 801 may also access and analyze database 100 or any other operational data. FIG. 8 shows illustrative recommendations and conclusions that may be generated by the sales effectiveness analysis system. Sales or comment sentiment may be correlated with the product 811 and model 812 to determine the best combination 821 of a model and product. Analysis system 801 may for example determine that certain models are more effective at selling certain products, or that certain models are more effective overall. A model who models clothing is an example of a method of displaying a product; more generally, the sales effectiveness analysis system may determine which methods of displaying products were most effective. The system may correlate sales or comment timelines with the content of the video frames and the content of overlay banners to derive conclusions 822. These conclusions may for example indicate that certain types of motion, audio, lighting, settings, or overlays are more or less effective in driving sales or positive comments. The sales effectiveness analysis system 801 may also scan the video frames 140 and correlate them with sales or comments to select the best images for each product, such as images 823; these images may be useful for example in advertising for products on websites or print media. These conclusions and suggestions 821, 822, and 823 are illustrative; one or more embodiments may analyze the sales session and related data to make any type of recommendations for future sales, promotions, or campaigns.

Figure 9:
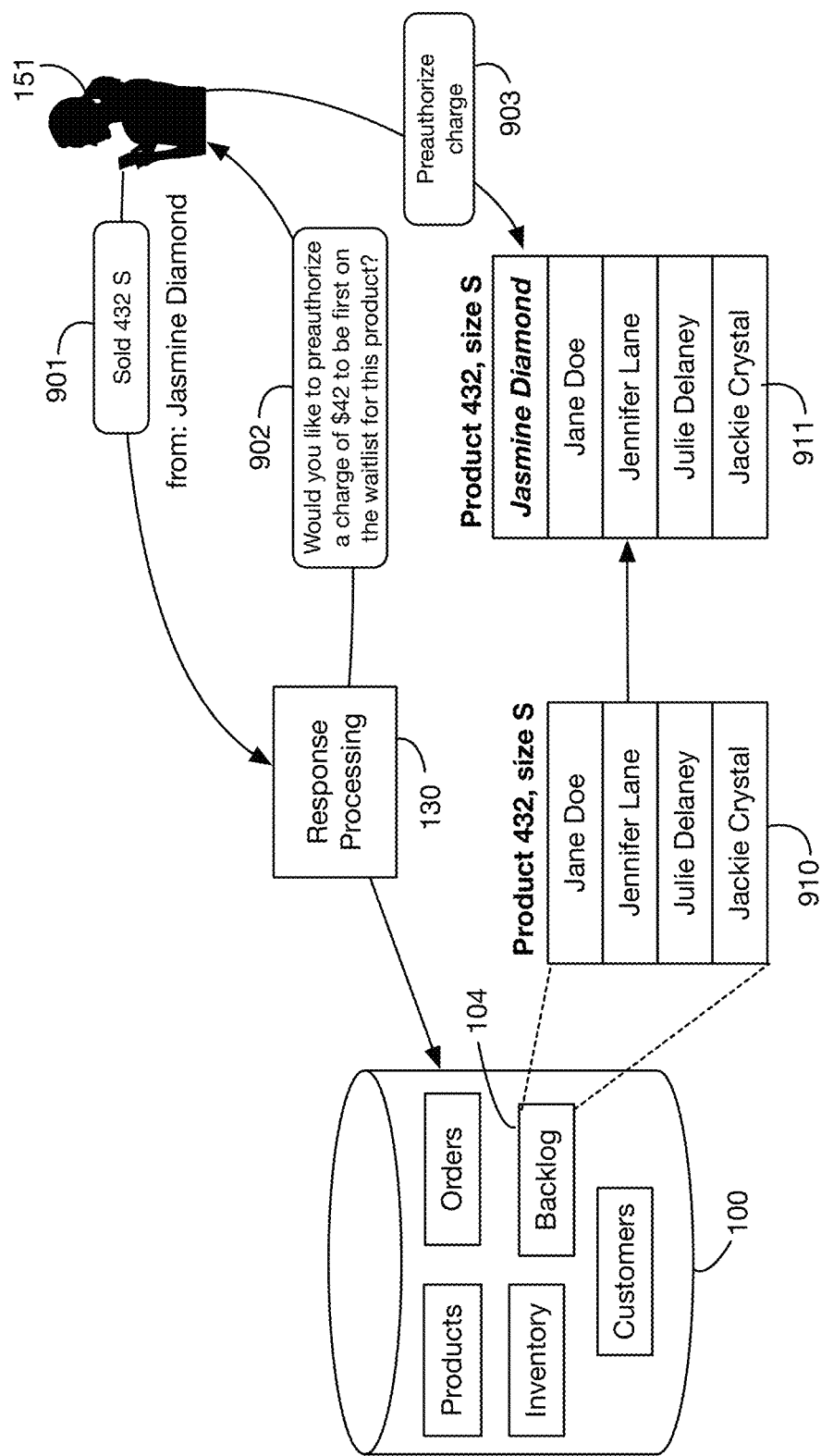
FIG. 9 shows an embodiment that prioritizes backlogged orders based on whether a customer has preauthorized a charge when the ordered item ships.

Merchants may accept orders for products that cannot be immediately shipped; these orders may be placed into a backlog queue for future shipment as stock is replenished. In one or more embodiments, customer data or customer actions may affect the priority of customer orders in the backlog. Merchants need not necessarily fulfill backlogged orders in a first-come, first-served order. One or more embodiments may provide a capability for a customer to be prioritized higher in the backlog by preauthorizing a charge for the order. This scenario is illustrated in FIG. 9. Customer 151 posts a comment 901 indicating a desire to order a product. The response processing system 130 processes the order, and determines that the desired product and size are backordered. Instead of adding the customer to the back of the backlog 910 for this product and size, the response processor sends a message 902 to the customer asking the customer to preauthorize the purchase. If the customer responds with a preauthorization 903 (which may for example involve providing a credit card number and an authorization to charge the card automatically when the product ships), then the customer may be placed at the front of the backlog 911, and may be the first (or among the first) to receive a shipment when the product is back in stock.

Figure 10:
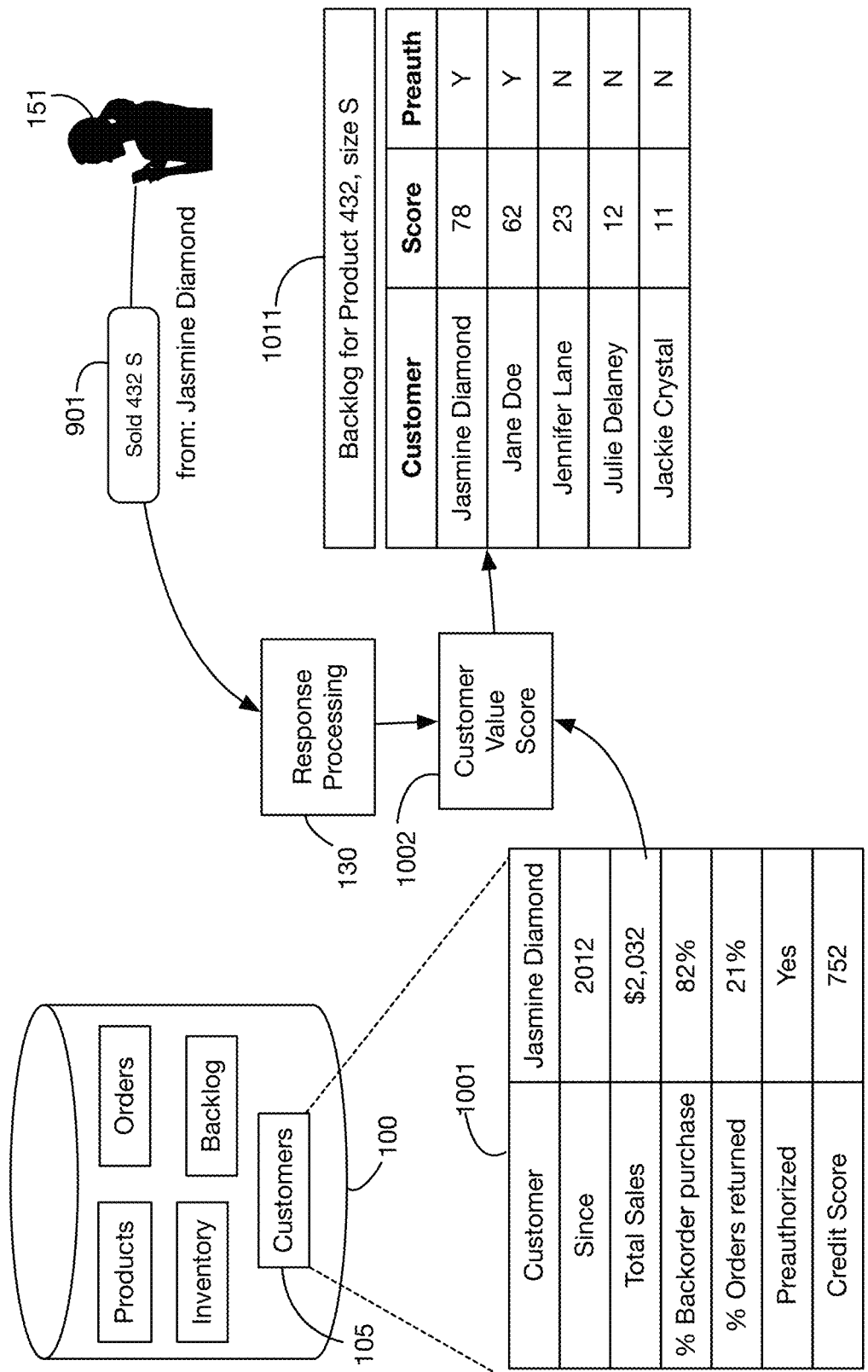
FIG. 10 shows an embodiment that prioritizes backlogged orders based on a customer value score that may combine factors such as customer order history, credit score, return history, and preauthorization of charges.

More generally, one or more embodiments may prioritize a backlog of backorders using any information about the customer, the order, charge preauthorization, or any other data in database 100 or from other data sources. Intelligent backlog prioritization may improve sales revenue, profitability, and customer satisfaction. FIG. 10 shows an illustrative embodiment that combines several types of data to intelligently prioritize order backlogs. In this embodiment, customer data 105 in database 100 contains a detailed profile of each customer; an illustrative profile 1001 is shown for customer 151. Whenever a customer places an order that goes into the backlog, a customer value score calculation 1002 determines the value of this customer compared to the value of other customers with backorders for the same product and options. The backlog 1011 for each backordered product is then prioritized by customer value score. Embodiments may calculate customer values scores using any desired algorithm or formula, for example by weighting customer attributes 1001 by any desired importance weights. Illustrative factors that may affect a customer value score may include for example, without limitation, how long the customer has been a customer, the number of orders a customer has made in the past, the total sales revenue from the customer's past orders, the profit margin on the customer's past orders, whether the customer has preauthorized a purchase of the backordered item (as described with respect to FIG. 9), the fraction of past backorders the customer has ultimately purchased, the fraction of past orders the customer has returned, and the customer's credit score. In one or more embodiments, backlog prioritization may also be based on the size of the order; for example, customers that order a larger quantity of a backlogged item may be prioritized above those who order only one item.

Figure 11:
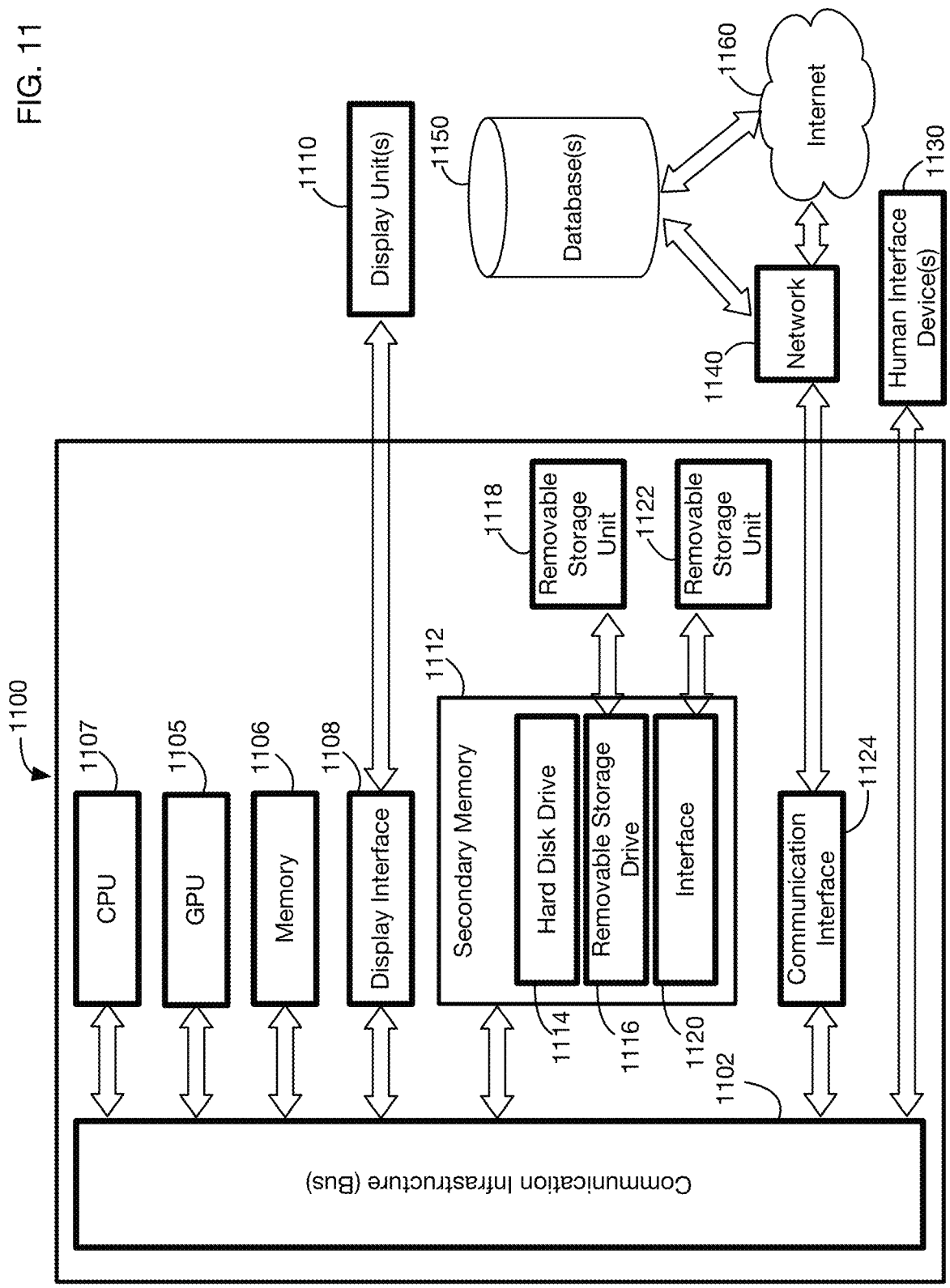
FIG. 11 shows illustrative computer hardware that may be used in one or more embodiments to execute any or all of the components of the system.

FIG. 11 shows an embodiment of exemplary computer 1100 that may be utilized in, by, or as any component in the system. In one or more embodiments, computer 1100 may be a network of computers, each of which may have any or all of the components shown in FIG. 11. In one or more embodiments, computer or computers 1100 may also be utilized to implement any function in the system, i.e., any step or act or function that executes in any computer or server or engine in the system. Computer 1100 may include processor CPU 1107 that executes software instructions specifically tailored to the respective functions of embodiments of the invention. The software instructions, otherwise known as computer program instructions, may reside within memory 1106. Computer 1100 may include processor GPU 1105, which may execute graphics instructions or other instructions for highly parallel operations, for example. GPU program instructions may also reside within memory 1106. Computer 1100 may include display interface 1108, which may drive display unit or units 1110 of any computer in the system as desired. Some computers 1100 may or may not utilize a display. Computer 1100 may include communication interface 1124, which may include wireless or wired communications hardware protocol chips. In one or more embodiments of the invention communication interface 1124 may include telephonic and/or data communications hardware. In one or more embodiments communication interface 1124 may include a Wi-Fi™ and/or BLU-ETOOTH™ wireless communications interface. Any wireless network protocol or type may be utilized in embodiments of the invention. CPU 1107, GPU 1105, memory 1106, display interface 1108, communication interface 1124, human interface devices 1130, secondary memory 1112, such as hard disk 1114, removable storage 1116, secondary memory interface 1120 and removable storage units 1118 and 1122 may communicate with one another over communication infrastructure 1102, which is commonly known as a "bus". Communications interface 1124 may communicate over any wired or wireless medium that allows for communication with other wired or wireless devices over network 1140. Network 1140 may communicate with Internet 1160 and/or database or databases 1150. Database 1150 may be utilized to implement any database described herein.

While the invention herein disclosed has been described by means of specific embodiments and applications thereof, numerous modifications and variations could be made thereto by those skilled in the art without departing from the scope of the invention set forth in the claims.

What is claimed is:

1. A live video sales management system that processes customer responses, comprising:
 a database configured to:
  store product data of one or more products, the product data comprising at least a product identifier or a service identifier; and
  store inventory data; and
 a processor coupled to a memory and configured to:
  execute a sales administration system coupled to said database, wherein the sales administration system is configured to:
   receive a video stream;
   display one or more of said one or more products;
   accept a selected product of said one or more products;
   perform video processing on said video stream to form a modified video stream, wherein said modified video stream comprises:
    information associated with said selected product; and
    a response template to indicate a purchase of said selected product;
  execute a video distribution system, wherein the video distribution system is configured to stream said modified video stream to one or more interactive video player applications, wherein
   each interactive video player application of said one or more interactive video player applications is configured to:
    display said modified video stream to a customer; and
    accept a response from said customer; and
  execute a response processing system coupled to said database, wherein the response processing system is configured to:
   obtain said response from said customer;
   in response to said response matching said response template, generate a purchase transaction for a purchase of said selected product by said customer; and
   update said database.

2. The system of claim 1, wherein
 said information associated with said selected product comprises one or more of said product identifier, a price, a product image, and a list of product options; and
 said response template comprises a keyword or key phrase, said product identifier, an optional quantity, and an optional product option of said list of product options.

3. The system of claim 1, wherein said one or more interactive video player applications comprise a website comprising:
 a video display area configured to display said modified video stream; and
 a customer comment area configured to accept said response from said customer.

4. The system of claim 1, wherein said one or more interactive video player applications comprise a mobile device app executing on a plurality of customer devices, wherein said mobile device app comprises:
 a video display area configured to display said modified video stream; and
 a customer comment area configured to accept said response from said customer.

5. The system of claim 1, wherein
 said one or more interactive video player applications comprise two or more interactive video player applications;
 said video distribution system is further configured to generate a video stream for each interactive video player application of said two or more interactive video player applications based on a video interface of said each interactive video player application; and
 said response processing system is further configured to transform responses from said each interactive video player application into a common response format.

6. The system of claim 1, wherein said video distribution system further configured is configured to:
 monitor a quality of said modified video stream; and
 switch to an alternate video stream when said quality of said modified video stream falls below a threshold value.

7. The system of claim 1, wherein
 said database is further configured to store customer data;
 said sales administration system is further configured to:
  obtain a customer identifier corresponding to said response;
  retrieve customer data from said database corresponding to said customer identifier;
  generate customer importance information based on said customer data; and,
  display said customer importance information with said response.

8. The system of claim 1, wherein said sales administration system is further configured to:
 update said modified video stream based on changes to said inventory data,
 update said modified video stream to indicate that one or more product options associated with said selected product are no longer available,
 update said modified video stream to indicate that only a limited number of said selected product remain in stock, or
 update said modified video stream to indicate that additional orders of said selected product are required prior to restocking said selected product.

9. The system of claim 1, wherein said perform said video processing on said video stream comprises generate an overlay onto frames of said video stream, and wherein
said database is further configured to store product images; and
said sales administration system is further configured to:
analyze each frame of said frames to locate an image of said selected product; and
position said overlay in said each frame at a location proximal to said image of said selected product.

10. The system of claim 1, further comprising
a sales effectiveness analysis system coupled to said database and to said response processing system, and configured to receive said video stream and analyze said video stream and said response from said customer after said video stream terminates to identify one or more of:
audio or visual elements in said video stream that resulted in high levels of responses or sales; and
product selections that resulted in high levels of responses or sales; and
wherein said sales effectiveness analysis system is further configured to recommend one or more of:
one or more video frames to select as static images to market one or more of said one or more products; and
one or more product display methods to market said one or more of said one or more products.

11. The system of claim 1, wherein
said database is further configured to:
store customer data; and
store backlog orders;
said response processing system is further configured to:
assign a priority to each backlog order of said backlog orders based on customer data associated with a customer associated with said each backlog order.

12. The system of claim 5, wherein said two or more interactive video player applications comprise two or more websites and a mobile device app configured to execute on a plurality of customer devices.

13. The system of claim 7, wherein
said customer data comprises customer order history;
said customer importance information is based on one or both of a number of orders by said customer in said customer order history and a sales revenue from said customer in said customer order history.

14. The system of claim 9, wherein said sales administration system is further configured to:
accept a plurality of selected products of said one or more products;
generate a plurality of overlays onto said frames corresponding to said plurality of selected products;
analyze said each frame to locate an image of each selected product of said plurality of selected products;
position each overlay of said plurality of overlays in said each frame at a location proximal to said image of said each selected product corresponding to said each overlay.

15. The system of claim 9, wherein said sales administration system is further configured to:
analyze each frame of said frames to determine one or more visible products of said one or more products in said each frame and set said selected product to one of said one or more visible products, or
analyze said response from said customer to generate one or more sales recommendations and display said one or more sales recommendations wherein said one or more sales recommendations comprise identification of a customer to mention in said video stream.

16. The system of claim 15, wherein said one or more sales recommendations comprise one or more of:
a recommendation to select a different product;
a recommendation to modify said overlay; and
a recommendation to modify a content of said video stream.

17. The system of claim 15, wherein
said database is further configured to store customer order history data; and
said identification of said customer to mention comprises identification of
a new customer, or
a customer who has made previous purchases of a number or value above a threshold.

18. The system of claim 11, wherein
said customer data comprises an indication of whether a charge has been preauthorized when said each backlog order is fulfilled; and
a backlog order with a preauthorized charge is prioritized higher than another backlog order without a preauthorized charge.

19. The system of claim 11, wherein
said customer data comprises customer order history; and
a backlog order associated with a first customer with a large number or value of prior orders is prioritized higher than another backlog order associated with a second customer with a smaller number or value of prior orders.

20. The system of claim 11, wherein said priority is based on one or more of:
whether a charge has been preauthorized when said each backlog order is fulfilled;
a size of said each backlog order;
an order return history of said customer;
a credit score of said customer; and
a fraction of previous backlogged orders from said customer.

* * * * *